Jan. 19, 1965 H. A. FROMSON 3,165,820
METHOD OF FORMING HONEYCOMB STRUCTURE
Filed Aug. 18, 1960 2 Sheets-Sheet 1
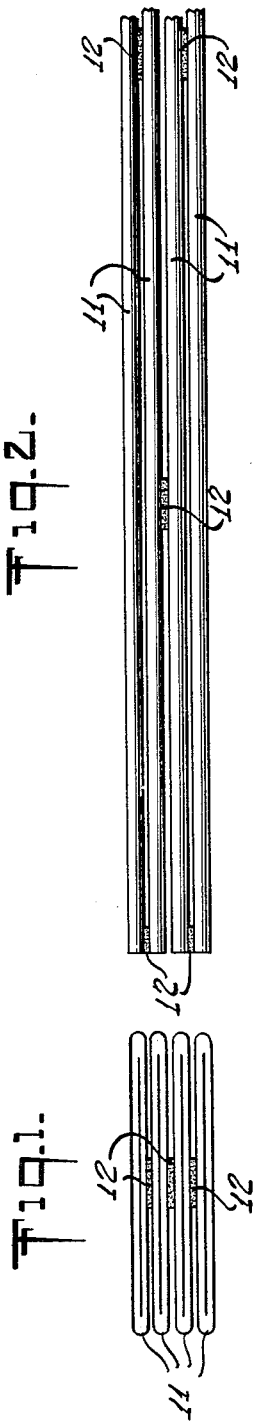
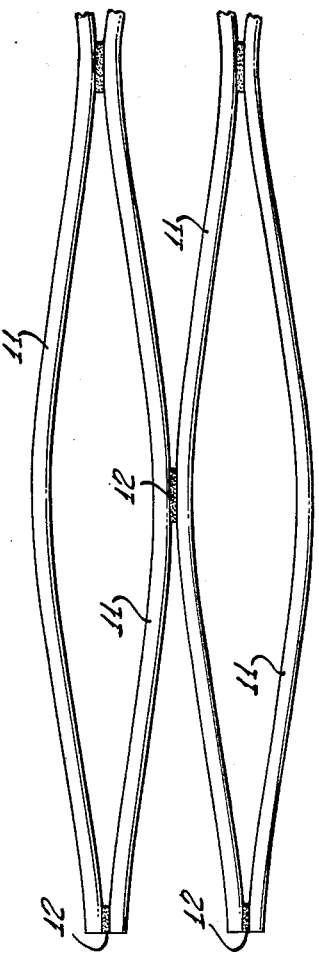
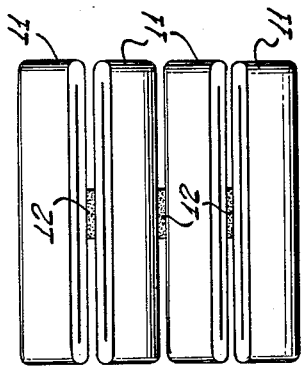
INVENTOR
HOWARD A. FROMSON
BY
Burgess, Ryan & Hicks
ATTORNEYS

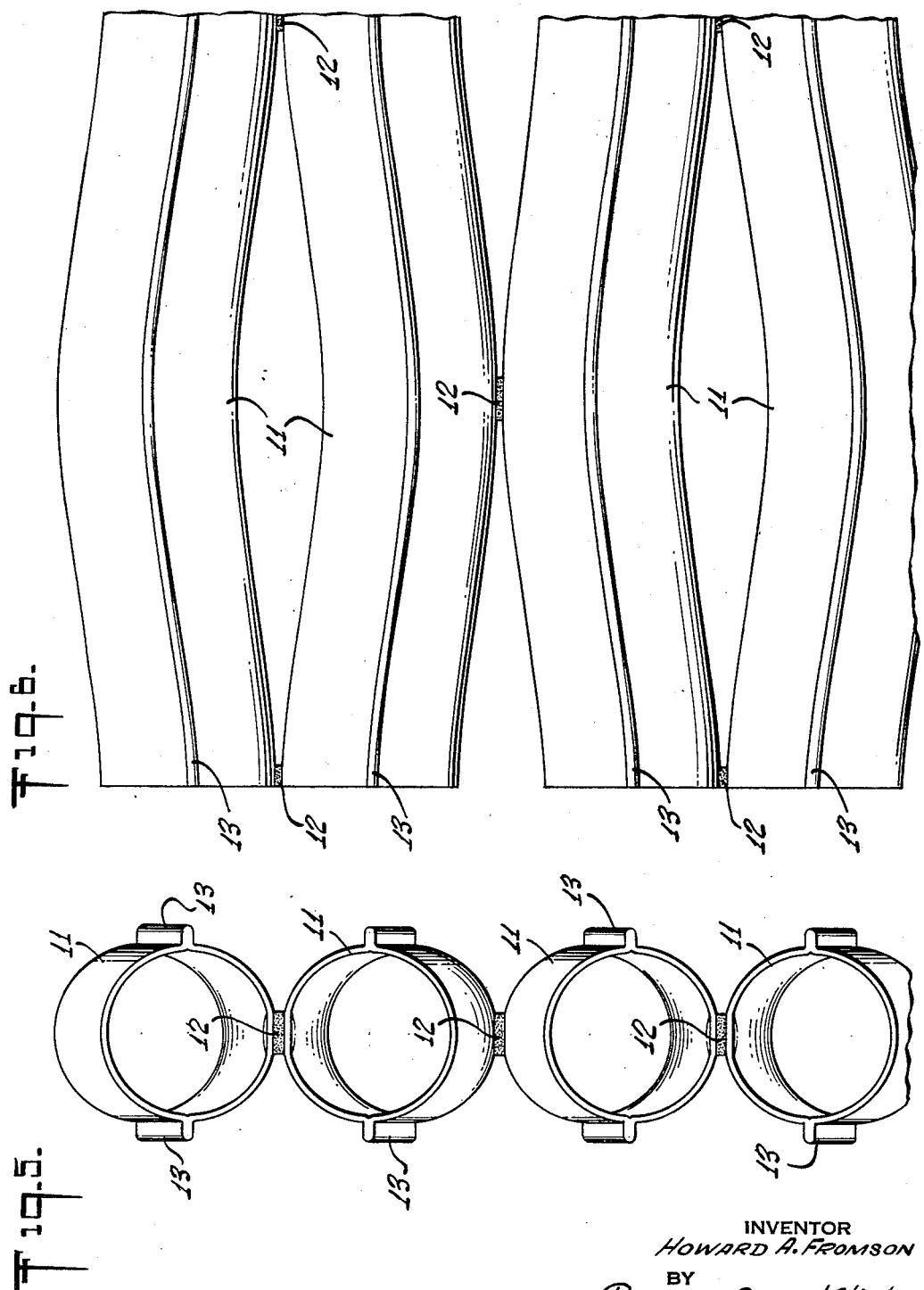

3,165,820
METHOD OF FORMING HONEYCOMB
STRUCTURE
Howard A. Fromson, Rogues Ridge Road, Weston, Conn.
Filed Aug. 18, 1960, Ser. No. 50,486
3 Claims. (Cl. 29—157.3)

The present invention relates to a honeycomb structure and method of forming the same. It relates, more particularly, to a honeycomb structure formed of a plurality of joined undulating tubes forming passageways for the flow of fluid through the structure from edge to edge thereof and the method of forming the same.

An object of the invention is to provide honeycomb structure comprised of joined undulating tubes through which fluid can flow and which is suitable for use in heat exchangers and the like. Another object of the invention is to provide a honeycomb structure formed of joined undulating tubes having extremely thin walls.

A further object of the invention is to provide an economical method of forming such a honeycomb structure without the need for special tools or equipment.

Other objects of the invention will be apparent and better understood from the following description and drawings, in which—

FIG. 1 is an end view of a collapsed honeycomb structure made in accordance with the present invention;

FIG. 2 is a partial side view of the honeycomb structure of FIG. 1;

FIG. 3 is an end view of the collapsed honeycomb structure of FIGS. 1 and 2 after it has been opened into a honeycomb;

FIG. 4 is a partial side view of the honeycomb structure shown in FIG. 3;

FIG. 5 is an end view of the opened honeycomb structure of FIGS. 3 and 4 after inflation of the tubular elements; and FIG. 6 is a partial side view of the honeycomb structure of FIG. 5.

In accordance with the present invention, a number of thin-walled collapsed tubes of metal or other suitable material in the form of flat ribbon-like strips are stacked one on top of the other, and the opposing outer surfaces of adjacent strips are joined together at spaced points throughout their lengths, with the joints for adjacent layers being offset. The stack of collapsed tubes or strips is then separated or expanded into configuration of a honeycomb and the flat strips are then inflated into tubular form so as to form closed fluid conducting passageways extending between opposite edges of the honeycomb structure.

Referring to the drawings, and to FIGS. 1 and 2 in particular, there is a series of flat ribbon-like strips 11 which are stacked successively on top of each other and which are capable of being inflated into tubular form. The strips which have unbonded opposing interior surfaces may be made of metal by collapsing thick walled tubes to a flattened condition and then rolling the flattened tubes to a desired wall thickness and the opposing interior surfaces may be coated or treated so that they will not bond together.

Each strip 11 is joined, as indicated at 12, at regularly spaced intervals to the adjoining strips. In order to form a uniform honeycomb, the points of joining on opposite sides of a given strip are offset with respect to each other by one half the spacing between the joints. The strips may be joined together in this manner by an adhesive, solder, brazing, metal or other suitable material.

In the illustrated embodiment, the joined areas of the opposing surfaces of adjacent strips do not extend across the full width of the strips to the edges thereof. In other words, the strips are joined along their center line, but not at their outer edges, so as to permit their inflation into tubular form. However, it will be understood that the strips may be joined across their full width, but in such case the unjoined sides of the strips will assume a rounded shape when the strips are inflated.

The stacked strips 11 which have been joined as shown in FIGS. 1 and 2 can then be readily expanded or opened into honeycomb configuration as shown in FIGS. 3 and 4 by pulling strips apart and in this manner a gently curved or undulating form for the individual tubes may be obtained. Finally, each of the strips is inflated into tubular or other desired shape to form passageways for the flow of fluid therethrough. This may be accomplished by prying open an end of a strip and introducing fluid under pressure into the interior of the strip to separate the unbonded interior surfaces thereof. Any tendency of strips to straighten during inflation may be overcome by inserting temporary wedges or spacing members into the open spaces between the adjoining strips prior to the inflation thereof. The gentle undulating form of the strips prior to inflation also tends to prevent wrinkling or tearing of the tubes as they are inflated. As mentioned above, the narrowness of the fastening of the strips along their center line permits the strips to be inflated to a rounded shape without interference.

For the sake of simplicity the drawings show only part of a honeycomb structure formed from four strips. However, it will be understood that the honeycomb may be comprised of any desired number of strips with each strip having many separate undulations and points of contact with the adjoining strips. Also, if desired, the strips 11 may be formed into the undulating shape of FIGS. 3 and 4 before being joined together.

The final product may be used in a heat exchanger, with one fluid passing through the tubes and another transverse to the honeycomb through the apertures between tubes. The honeycomb in the collapsed form of FIG. 1 or the opened but uninflated form of FIGS. 3 and 4 is easily stored and transported. A desired length of honey comb may be cut in the collapsed form of FIGS. 1 and 2 by power shears or other devices which might crush or mangle the tubes in an inflated condition.

The honeycomb structure may have tube walls of any desired thinness and each tube may have fins 13 extending along opposite sides thereof. Such fins not only help strengthen the tubes and make them more rigid, but they serve as protection from denting and abrasion at the most exposed areas of the tube.

It will be understood that various changes and modifications may be made in the particular embodiments and methods of practicing the invention which have been described and illustrated herein without departing from the scope of the invention, as defined by the following claims.

I claim:

1. The method of forming a honeycomb structure of interconnected members having internal fluid conducting passages therein which comprises the steps of assembling a plurality of flat ribbon-like strips in superimposed vertically stacked relation relative to each other, each of said flat ribbon-like strips having unbonded opposing interior surfaces defining a central fissure extending lengthwise and confined within the sides thereof, said flat strips being expansible into hollow form, joining opposing central areas on exterior surfaces of adjoining strips at spaced points throughout their length, said joined central areas having a width less than the width of the flat strips separating unjoined opposing surfaces of adjacent strips and then forming an internal fluid conducting passage in each of the strips by inflating the respective strips and separating the unbonded opposing interior surfaces thereof.

2. The method of forming a honeycomb structure as defined in claim 1 wherein alternate sides of each strip are joined to opposing surfaces of adjoining strips at points which are offset relative to each other.

3. The method of forming a honeycomb structure as defined in claim 1 which includes the step of inserting a space maintaining member between the separated opposing surfaces of adjoining strips during inflation of the strips.

References Cited in the file of this patent
UNITED STATES PATENTS

| | | |
|---|---|---|
| 1,521,864 | Broido | Jan. 6, 1925 |
| 2,578,136 | Huet | Dec. 11, 1951 |
| 2,662,273 | Long | Dec. 15, 1953 |
| 2,690,002 | Grenell | Sept. 28, 1954 |
| 2,850,793 | Schweller et al. | Sept. 9, 1958 |
| 2,856,164 | Adams | Oct. 14, 1958 |
| 2,999,306 | Baxter | Sept. 12, 1961 |